United States Patent [19]

Stephan et al.

[11] Patent Number: 5,350,797

[45] Date of Patent: Sep. 27, 1994

[54] THERMOSETTING REACTION ADHESIVES

[75] Inventors: Kurt Stephan, Herisau; Roman Schmidt; Hans Widmer, both of Pfäffikon, all of Switzerland

[73] Assignee: Huber & Suhner AG, Pfäffikon, Switzerland

[21] Appl. No.: 178,451

[22] Filed: Jan. 7, 1994

Related U.S. Application Data

[63] Continuation of Ser. No. 930,984, Aug. 17, 1992, abandoned.

[30] Foreign Application Priority Data

Sep. 6, 1991 [EP] European Pat. Off. ........ 91115138.9

[51] Int. Cl.$^5$ ..................... C08L 67/06; C08G 63/02
[52] U.S. Cl. ..................... 525/28; 525/167; 525/168
[58] Field of Search ............ 525/28, 167, 168

[56] References Cited

U.S. PATENT DOCUMENTS

| | | | |
|---|---|---|---|
| 4,048,257 | 9/1977 | Stevenson | 525/28 |
| 4,548,992 | 10/1985 | Doi et al. | 525/167 |
| 4,822,849 | 4/1989 | Vanderlaan | 525/17 |

FOREIGN PATENT DOCUMENTS

| | | |
|---|---|---|
| 0158462 | 10/1985 | European Pat. Off. . |
| 1719177 | 8/1971 | Fed. Rep. of Germany . |
| 1530819 | 7/1967 | France . |
| 1195835 | 6/1970 | United Kingdom . |

*Primary Examiner*—James J. Seidleck
*Assistant Examiner*—I. Zemel
*Attorney, Agent, or Firm*—Dilworth & Barrese

[57] ABSTRACT

The thermo-setting reaction adhesive present as a mono-component system contains as its essential components respectively at least a) one unsaturated scaffold polymer based on a non-cross-linked elastomer in a share of 5 to 90% by weight, b) one unsaturated polyester in a share of 5 to 90% by weight, c) one unsaturated cross-linking agent in a share of 0.1 to 50% by weight, d) one setting catalyst which provides radicals with an activation temperature of 60° to 300° C. in a share of 0.2 to 6% by weight and f) optionally other additives. The adhesive is distinguished by high storage stability and high adhesive strength with a short cross-linking time and it is particularly suitable for bonding thermo-shrinking molded parts.

16 Claims, No Drawings

THERMOSETTING REACTION ADHESIVES

This is a continuation of copending application Ser. No. 07/930,984 filed on Aug, 17, 1992, now abandoned.

BACKGROUND OF THE INVENTION

The invention concerns mono-component reaction adhesives which can be set by heat. In particular, it concerns a thermosetting reaction adhesive which is suitable for the adhesion of thermo-shrinking molded parts.

The action adhesives are distinguished by the fact that they are present as reaction-capable monomer or oligomer components before setting, which during the adhesion are transformed into high molecular spatially cross-linked polymers. Corresponding to the possible types of the polymerization reaction, reaction adhesives are classified as polymerization, polyaddition and polycondensation adhesives.

Polymerization adhesives are set by radical or ionic polymerization wherein in the first case the radicals necessary for the reaction are generated by UV radiation or by electron rays, but mostly by radical-forming catalysts such as peroxides. Cold setting reaction adhesives are easy to process, but they usually require a long setting time. Thermo- and heat setting reaction adhesive compositions only bind at temperatures from 80° to 200° C., but they supply very high adhesive strengths.

In the case of mono-component reaction adhesives, frequently storage problems occur, because the adhesive components react with each other in the course of time. A remedy is provided by bi- or multi-component adhesive systems, in which the reactive components are only mixed with each other shortly before the bonding.

U.S. Pat. No. 4,548,992 describes a bi-component reaction adhesive in which component I contains an acrylic monomer and an organic peroxide, while component II contains an acrylic monomer and a setting accelerator. Furthermore an unsaturated polyester is present in components I and/or II.

Mono-component reaction adhesives which set radically, are simple to handle but often are not sufficiently stable in storage or are only used for special applications. EP 158 462-A2 discloses adhesive compositions, which harden at room temperature, but are not suitable for bonding metal surfaces.

Typical reactive components of a mono-component reaction adhesive are one or more long-chain ethylene unsaturated polymers, as well as low molecular monomer or oligomer olefins, which cross-link as "bridges" the long-chain polymers with each other during the setting.

DE-OS 17 19 177 describes a thermosetting adhesive which is present on a carrier material in the form of a thermosetting self-adhesive tape. The essential components of this adhesive are an elastomer resistant to oil, an adhesive resin and an unsaturated polyester as the reactive components and a solvent polymerizable therewith. Additional components are optionally a peroxide catalyst or a cross-linking reagent. Preferably, an unsaturated ester monomer is used as the polymerizable solvent. One part of the adhesives described here has the disadvantage that the viscosity increases strongly within a few days and the properties described, e.g. self-adhesive, are lost. The adhesive therefore cannot be stored for long periods. The other adhesive combinations only harden very slowly and are unsuitable for use in an industrial production process.

SUMMARY OF THE INVENTION

The invention is based on the object of making available a thermosetting reaction adhesive as a mono-component system, which is distinguished against the known adhesives primarily by increased storage stability and a short cross-linking time, the adhesiveness and activation temperature of the cross-linking being freely adjustable. In particular, the adhesive should be suitable for bonding heat shrinking molded parts.

This problem is solved by the composition disclosed in herein for a thermosetting reaction adhesive.

DESCRIPTION OF THE PREFERRED EMBODIMENTS

The adhesive process, i.e., the cross-linking by a polymerization reaction between the reactive components, is initiated by radicals which are released by the influence of heat from the hardening catalyst. A cross-linking of the unsaturated scaffold polymer and of the unsaturated polyester takes place, wherein the ethylenically unsaturated low molecular cross-linking agent cross-links the long-chain polymers, forming intra- and especially inter-molecular bridges.

For the uncross-linked scaffold polymer (backbone polymer), one or more ethylene-unsaturated elastomers, particularly rubbers or compounds similar to rubber, are used. A survey of the inventively suitable scaffold polymers is provided in the list below. The abbreviations have been performed in accordance with the DIN-/ISO norm 1629.

M group

The M-group includes rubbers with an unsaturated chain of the polymethylene type.

| | |
|---|---|
| ACM | copolymers of ethylacrylate or other acrylates with a small moiety of a monomer which facilitates the vulcanization |
| ANM | copolymers of ethylacrylate or other acrylates and acrylonitrile |
| CM | chlorinated polyethylene |
| CSM | chlorosulfonated polyethylene |
| EPDM | terpolymers of ethylene, propylene and a diene with an unsaturated part of the diene in the side chain |
| EPM | ethylene-propylene-copolymerisate |
| FPM | rubbers with fluoro-, fluoro-alkyl- or fluoro-alkoxy groups on the polymer chain |

O group

This group includes rubbers with oxygen in the polymer chain.

| | |
|---|---|
| CO | polychloro-methyl-oxirane (epichloro-hydrine rubbers) |
| ECO | copolymers of ethylene oxide (oxirane) and chloromethyl-oxirane (epichloro-hydrine) |
| GPO | copolymers of propylene oxide and allyl glycide ether |

Epichloro-hydrine-containing terpolymers such as ETER are also included in this group.

R group

The R group is characterized in that before the letter "R" (=rubber) one or more abbreviations are inserted for the monomer or monomers, from which the rubber was produced. The letter directly before the "R" identifies the diolefin, from which rubber was produced. One letter (or more letters) before the diolefin letters identify the comonomer or comonomers. The following classification is used for the R group:

| | |
|---|---|
| ABR | acrylate-butadiene rubbers |
| BR | butadiene rubbers |
| CR | chloroprene rubbers |
| IIR | isobutene-isoprene rubbers |
| IR | synthetic.isoprene rubbers |
| NBR | acrylonitrile-butadiene rubbers |
| NCR | acrylonitrile-chloroprene rubbers |
| NR | isoprene rubbers (natural) |
| PBR | vinylpyridine-butadiene rubbers |
| EBR | styrol-butadiene rubbers |
| SCR | styrol-chloroprene rubbers |
| SIR | styrol-butadiene rubbers |
| NIR | acrylonitrile-isoprene rubbers |
| PSBR | vinylpyridine-styrol-butadiene rubbers |

Rubbers containing carboxyl groups are identified by the prepositioned letter "X":

| | |
|---|---|
| XSBR | carboxyl-group-containing styrol-butadiene rubbers |
| XNBR | carboxyl-group-containing acrylon-nitrile-butadiene rubbers |

Rubbers with halogen on the polymer chain are classified as follows:

| | |
|---|---|
| BIRR | bromine-isobutene-isoprene rubbers |
| CIRR | chloro-isoprene rubbers |

Q group

The Q group is characterized in that the name of substitutes on the polymer chain is placed in front of the silicon designation.

| | |
|---|---|
| MFQ | silicon rubbers with methyl and fluoro groups on the polymer chain |
| MPQ | silicon rubbers with methyl and phenyl groups on the polymer chain |
| MPVQ | silicon rubbers with methyl-, phenyl- and vinyl groups on the polymer chain |
| MNQ | silicon rubbers with exclusively methyl groups on the polymer chain such as polydimethyl-siloxane |
| MVQ | silicon rubbers with methyl- and vinyl groups on the polymer chain |

U group

The U group includes rubbers with carbon, oxygen and nitrogen in the polymer chain.

| | |
|---|---|
| AFMU | terpolymers of tetrafluoro-ethylene, trifluoro-nitrosome-methane and nitroso-perfluoro-butyric acid |
| AU | polyesterurethane rubber |
| EU | polyetherurethane rubbers |

Furthermore, the NBR rubbers which are not listed above with end position vinyl-, carboxyl- and amine groups or ethylene-vinyl acetate (EVA) are suitable.

In addition to the unsaturated elastomers, saturated scaffold polymers may be present, whose amount is however adjusted so that they do not adversely affect the cross-linking time or the other properties of the adhesive.

However, it is also possible initially in a pre-reaction to produce separately the unsaturated scaffold polymer as a reaction product of an elastomer-containing hydroxyl groups with a di-isocyanate. To do this, a mixture of the elastomer-containing hydroxyl groups and of the unsaturated polyester is reacted with a prepolymer of a di-isocyanate (e.g. 4,4-methylene-bis(-phenylisocyanate)(MDI) (e.g., Desmodur ® available from Bayer) and hydroxyethylmethacrylate (HEMA).

By the reaction of the hydroxyl groups with the di-isocyanate, double bindings are deliberately introduced which can react with the unsaturated polyester during the bonding via the cross-linking agent. Hereby it is possible to use scaffold polymers with particular properties, such as high resistance to kerosine, which otherwise would not be usable because of the absent reactive double bonds. Above all, polyester-urethanes which contain hydroxyl groups such as Desmocoll ® 540 from Bayer are suitable.

The unsaturated polyesters are used either dissolved, in viscous form or as solids. The polyesters can be present in a solution containing styrol, but preferably in styrol-free solution. Preferably they are made of unsaturated multi-basic carboxylic acids, e.g. fumaric acid, maleic acid, ataconic acid, citraconic acid, mesaconic acid and their anhydrides, as well as combinations of unsaturated/saturated multi-base carboxylic acids which are reacted with multi-valent alcohols, such as ethylene-, propylene-, neopentyl-1,4-cyclohexanediol-methanol, 1,4-butanediol, bisphenol A etc.

The following unsaturated polyesters are particularly suitable:

| | |
|---|---|
| Viapal$^R$ 570 G (unsaturated polyester resin, styrol-free, based on tricyclodecandiol) | (Vianova) |
| Viapal$^R$ 495 G (unsaturated polyester resin, styrol-free, based on bisphenol A) | (Vianova) |
| Synolite$^R$ 1835 (unsaturated polyester resin based on terephthalic acid, styrol-free) | (DSM-Resines) |
| Synolite$^R$ 9193 HV (unsaturated polyester resin based on isophthalic acid/neopentylglycol, styrol-free) | (DSM-Resines) |
| Palatal$^R$ M 610-21 (unsaturated polyester resin, styrol-free based on maleic/adipic acid) | (BASF) |
| Crystic$^R$ 198 (unsaturated polyester resin, based on propylene glycol, phthalic and maleic acids, styrol-free) | (Dr. Walter Mäder) |
| Haftharz LTH$^R$ (unsaturated polyester resin,styrol-free based on terephthalic/phthalic fumaric acids) | (Hüls) |
| Roskydal$^R$ 850 W (Bayhydrol$^R$ 850 W, see, e.g., German Patent 2804216 or European Patent 3337) | (Bayer) |

Monomers or oligomers of unsaturated compounds can be used as the cross-linking agent, which can undergo a polymerization reaction with the unsaturated scaffold polymer and the unsaturated polyester. Ethylene-unsaturated hydroxyesters, amino amide compounds, ether mono esters, derivatives of glycol, glycidylester, including the bisphenol A and F derivatives (e.g. Rütepoex ® Harz VE 3582) are suitable. Unsaturated oligomers of polyurethane (PU), epoxides (EP) or unsaturated polyesters (UP), as well as melamine can also be used, which are additionally capable of accelerating the reaction or improving the adhesion. Particular preference is given to di-, tri- and higher functional acryl- and methylacryl compounds such as alkyl- and arylacrylate and methacrylate, e.g. acrylic acid or methacrylic acid of diol compounds of butane to dodecane.

In addition mono-functional cross-linking agents may be present, whereby the "bridge" between the scaffold polymers and/or unsaturated polyesters is extended during the cross-linking reaction. By this addition, particularly of monomer acrylate compounds, the hardness of the cross-linked adhesive can primarily be adjusted.

The polymerization reaction is initiated by one or more added setting catalysts, which decompose with radical formation under the influence of heat. Preference is given to peroxide compounds which react in a temperature range from $+60°$ to $+300°$ C. Suitable peroxides include e.g. tert-butylperbenzoate, tert-butylpermaleate or bis(tert-butylperoxy-isopropyl)benzene. Particular preference is given to peroxides on the perketal basis, because they do not adversely affect the high storage stability of the inventive adhesive, e.g. 1,1-di(tert-butylperoxy)-3,3,5-trimethylcyclohexane (Interox® TMCH 50 AL), n-butyl-4,4-di(tert-butylperoxy)valerate, ethyl-3,3-di(tert-butylperoxy)butyrate, 3,3,6,6,9.9-hexamethyl-1,2,4,5-tetraoxa-cyclohexane, 2,2-bis(tert-butylperoxy)butane (Interox® BU AL 50), 1,1-bis(tert-butylperoxy)cyclohexane. Benzoylperoxide encapsulated in gelatine is also suitable. The melt temperature of the gelatine is adjusted to a range of more than 60° C.

Azo compounds are also considered as cross-linking agents, in which case foaming may occasionally occur during bonding.

Apart from the above-named components, other additives may be present in the inventive adhesive depending on the requirement and use. The adhesive can contain as additives such as fillers, pigments, carbon black and/or softeners.

The addition of black pigment ($Fe_2O_3$, e.g. Bayferrox® 318 M from Bayer) accelerates the polymerization reaction, whereby short cross-linking times are achieved and the work can be performed at lower activation temperatures. In large scale industrial use, a clear saving of energy can thus be achieved. The moiety of black pigment in the adhesive is preferably about 0.1 to 5.0% by weight, with special preference for approximately 1.0 to 2.0% by weight. The storage stability is not adversely affected.

Carbon black, chalk or the like can also be used as pigments. In the special case, e.g. in the case of metal composite substances in the automobile industry, the elasticity of the adhesive can additionally be adjusted by softeners, e.g. Mesamoll® (ester based on alkanesulfone acid/phenol). Silanes can also be added for adhesion conveyance on glass.

To accelerate polymerization, activating substances which are known or accelerators in dissolved or solid form can also be used as additives. Particularly suitable for this purpose are cobalt-naphthenate, cobalt-octoate, primary, secondary and tertiary amines as well as sulfimides. The activating substances are used in the normal technical concentrations.

In many cases it is necessary to supply the inventive adhesive in dissolved form, the selection of the solvent being guided by the polarity of the elastomers used: for strongly polar elastomers, keto- or aromatic compounds such as acetone, methylethyleketone (MEK), methylacetate, ethylacetate, toluene, xylene or mixtures thereof are suitable. For less polar elastomers, preference is given to petroleum ethers with boiling limit ranges from 60° to 95° C., 80° to 110° C. and 110° to 140° C., as well as toluene or xylene.

The inventive adhesive may furthermore contain stabilizers, e.g. liquid bisphenol A diglycidylether (e.g. Beckopox®) and thermostabilizers, rubber ageing agents (e.g. derivatives of phenol) in formulations containing halogen, hydroquinone or its derivatives as storage stabilizers for the cross-linking agent. The stabilizers are adapted in the usual manner to the adhesive system.

The inventive adhesive is distinguished from the known adhesive compositions by a clearly increased storage life. The minimum storage time of the adhesive which is either packed to be oxygen-permeable or under an air cushion at room temperature is one year, preferably at least two years. In other words, the adhesive of the present invention has a storage life of at least two years at room temperature when packed with free oxygen access. The adhesive is suitable for bonding a plurality of materials, preferably metal, plastics, glass, ceramics, non-porous or porous materials with themselves or against each other. Particular preference is given to the adhesive for bonding thermo-shrinking molded parts such as shrink foils and tubes, of (peroxidically and/or radiation-) cross-linked polyolefins against metal and against themselves. In other words, the adhesive of the present invention can be used for bonding thermo-shrinking molded parts of cross-linked polyethylene against metal or against itself.

The adhesive is applied from the solution on one or both sides on the workpieces to be bonded, or it is applied as film, foil, plate, paste tape, strand with or without solvent, with or without carrier material (e.g. tape or non-woven material) with or without a core. In the case of peroxo or radiation-cross-linked polyethylene, an application of the adhesive on one side of the substrate is usually sufficient. A further characteristic of the inventive adhesive is its very short cross-linking time compared with the known adhesives, with relatively low activation temperature, which can be freely adjusted depending on the desired application. The attainable bonding strengths are throughout well above the values for comparable known adhesives. Thus e.g. when bonding radiation-cross-linked polyethylene with aluminium, after a 3 minutes application of temperature at 120° C., the bonding and crosslinking have progressed to such an extent that after 24 hours storage time, under stress there is a break in cohesiveness and the shelling strength is more than 100 N/25 mm. When bonding chromatized aluminium with itself, tension shear values of 12 $N/mm^2$ are attained.

Suitable combinations of unsaturated polyester (soft and/or solid) with the scaffold polymer permit adjustments of the adhesive from soft to hard and from strongly self-adhesive up to a block-free film. The adhesion on substrates is adjusted primarily by unsaturated polyesters and cross-linking agents. The elasticity of the cross-linked adhesive is controlled by the percentage share and kind of the elastomer (scaffold polymer).

It is expedient to classify the scaffold polymers in certain groups, which facilitates their selection depending on the use or application field of the adhesive.

1. Group: MFQ, MPQ, PVQ, MPVQ, AMFU, FPM

Suitable for high temperature-resistant, specially heat stressed adhesives with good ageing and chemicals resistance in paste, tape or foil form.

2. Group: ACM, ANM, ABR, XSBR, XNBR, CO, ECO, ETER

Suitable for temperature-resistant, oil-resistant and chemical-resistant adhesives which usually have good resistance to ageing from solvents, or in paste, tape, foil or plate form.

3. Group: EPDM, EPM, CM, CSM, CR, NBR, NCR, SBR, SIR, NIR, PSBR, AU, EU

Suitable for adhesives from solvents with good ageing resistance, partly with good oil resistance and good resistance to water, or in paste, tape, foil or plate form without high requirements for resistance to temperature.

4. Group: elastomers or rubbers with specific properties, e.g. IER (highly gas-proof); IR, NR (high elasticity); BIIR and CIIR are particularly suitable for blending with other rubbers.

The following unsaturated polyesters usually have good compatibility with the rubbers of the first and second groups: Crystic® 198, Synolite® 9193 HV, Viapal® 570, Roskydal® 850 W.

For groups 3 and 4, the above unsaturated polyesters as well as Haftharz LTH and Viapal® 495 G are especially compatible. Slight manifestations of incompatibility can in some cases be compensated for by the cross-linking agent, and this applies especially to dissolved combinations.

For the production of the inventive adhesive, especially with respect to the compatibility of the combinations of scaffold polymers with unsaturated polyesters and cross-linking agents, the following points must be borne in mind:

Ethylacrylate polymers with hydroxyl groups (ACM groups) are more compatible with low molecular unsaturated polyesters, and there is no limitation in the compatibility with low molecular cross-linking agents. The combination of chloro-sulfonated polyethylene (BSM group) with the following unsaturated polymers is especially compatible: Crystic® 198, Viapal® 570 G or Roskydal® 850 W. There is also good compatibility with low molecular cross-linking agents. The same applies to compounds of the CM group.

Epichlorohydrine rubbers of the CO group can be especially well combined with low molecular unsaturated polyesters such as Roskydal® 850 W or Crystic® 198 and Haftharz LTH®. There are also good compatibilities with the low molecular cross-linking agents.

Nitrile rubbers, rubbers of the NBR and SNBR group are as a rule compatible with the following unsaturated polyesters: Crystic® 198, Synolite® 9193 HV, Viapal® 570 G and Roskydal® 850 W. There is also no limitation in the combination with low molecular cross-linking agents. Polyurethane rubbers of the HU group are compatible, because of their polarity, with only a few polyesters, but these elastomers can well be combined with Crystic® 198, Synolite® 9193 HV. The cross-linking agents are usually well compatible.

Polychloroprenes of the CR group can well be combined with Synolite® 9193 HV and Haftharz LTH. There is broad compatibility with the low molecular cross-linking agents.

The softening points of the unsaturated polyesters also have an influence on the adhesion of the adhesive and the selection of the polyester used is guided by the special use. Unsaturated polyesters with a softening range from 25° to 60° C., possibly combined with higher-softening polyesters, are especially suitable for self-adhesive uses. Unsaturated polyesters with a softening point from 60° to 100° C. are suitable for less adhesive uses with activating temperatures from 80° to 120° C. Unsaturated polyesters with a melting point above 100° C. are preferably used for dry films, foils and tapes, the activating temperature of which is above 120° C. The adhesion is achieved e.g. by free carboxyl groups, the hardness and temperature resistance can be increased by bisphenol A compounds.

In the following examples preferred embodiments of the inventive adhesive, which can be produced on the basis of the specifications above in accordance with conventional processes, are listed. The invention, however, is not to be restricted to the specifications named in the examples.

EXAMPLE 1

An adhesive produced in accordance with the invention was subjected for an investigation of its properties to a test in accordance with VG norms 95343 and 95214 for bonding with thermo-shrinking molded parts.

Sample preparation for the VG tests

The thermo-shrinking molded part (cable coverings of radiation cross-linked polyethylene) is coated internally on both ends up to a depth of about 1 cm and a wet-film strength of 0.7 mm with the 65 % adhesive. Then it is left to dry at room temperature for up to 72 hours. To produce the test body, the molded part is heated with hot air IR radiation (flame or in the furnace at temperatures of 150°–450° C.). Then the shrinking process begins. The molded part flexes around an aluminium adapter and a cable. The temperatures which arise between the molded part and aluminium, and the molded part and the cable are about 120° C. The shrinking process lasts 3 minutes. The samples prepared in this way are stored for 7 days at room temperature and are then tested.

Norm:

VG-95214 T05: test of compounds with thermo-shrinking component VG-95343 T14: bondability of component groups, Nato-code: chemical resistance See the table for the test findings

TABLE

| Test parameters | | unit | measured values | rated values |
|---|---|---|---|---|
| 1. dyn. shear force at with temperature stress | 23° C. | N | 920 | >300 |
|  | 50° C. | N | 562 | >210 |
|  | 70° C. | N | 357 | >150 |
|  | 100° C. | N | 282 | >110 |
| 2. static shear force at temperature stress (tensional force) | 23° C. | N | 850 | >300 |
|  | 50° C. | N | 885 | >300 |
|  | 100° C. | N | 810 | >300 |

TABLE-continued

| | Test parameters | | unit | measured values | rated values |
|---|---|---|---|---|---|
| 3. | torque | | N | 510 | >300 |
| 4. | resistance to chemicals (24 h/70° C.) | test agent No./ Nato-code | | | |
| | | 1.2/F-40 | N | 251 | >150 |
| | | 1.4/O-156 | N | 483 | >150 |
| | | 1.6/G-354 | N | 500 | >150 |
| | | 1.7/H-515 | N | 450 | >150 |
| | | water/— | N | 770 | >150 |
| 5. | heat-shock shell-strength 4 h/215° C. dyn. | mold p./cable | N/25 mm | 136 | >60 |
| | | mold p./adapt. | N/25 mm | 370 | >60 |
| | | shear force | N | 1435 | >300 |
| 6. | heat-ageing shell-strength 168 h/160° C. dyn. | mold p./cable | N/25 mm | 135 | >60 |
| | | mold p./adapt. | N/25 mm | 79 | >60 |
| | | shear force | N | 1435 | >300 |
| 7. | flexibility at low temp. | | N | 662 | >300 |
| 8. | shell strength | mold p./cable | N/25 mm | 282 | >60 |
| 9. | shell strength | mold p./adapter | N/25 mm | 354 | >60 |

For all the test parameters, the measured values are above the minimum values required by the norm.

EXAMPLE 2

Prescription for the inner coating of thermo-shrinking molded parts

| | |
|---|---|
| Elastomer (CM) | 17.0% by weight |
| unsaturated polyester (Roskydal$^R$) | 18.0 |
| cross-linking agent (trimethylolpropane triacrylate) | 7.5 |
| peroxide (2,2-bis(tert-butylperoxy)butane) | 1.3 |
| filler (Fe$_2$O$_3$ Bayferrox$^R$ 318 | 1.0 |
| stabilizer (Beckopox$^R$ 140) | 0.3 |
| solvent: methylethylketone | 37.0 |
| toluol | 17.9 |
| | 100 |

The solution is applied in the brush- or injection process to the thermo-shrinking parts and the solvent is removed in a vacuum. The metal surfaces or plastic surfaces on which shrinkage is to take place, must be free of fat, oil and dust and possibly be roughened. In the shrinkage process, the molded part is shrunk in an air flow between 250° and 600° C. onto the aluminium adapter and the cable jacket. After cooling the parts can be manipulated. The strength after 24 hours leads to cohesion fracture.

EXAMPLE 3

Prescription for bonding thermo-shrinking parts on the basis of polyesterurethane/unsaturated polyester and prepolymer

| | |
|---|---|
| Elastomer (AU) | 11.00% by weight |
| unsaturated polyester (terephthalic acid basis) | 9.80 |
| prepolymer MDI/HEMA | 8.80 |
| cross-linking agent (trimethylolpropane triacrylate) | 8.70 |
| unsaturated polyester (maleic acid/terephthalic acid base) | 21.80 |
| black pigment | 1.80 |
| methylethylketone | 36.59 |
| peroxide catalyst (2,2-bis(tert-butylperoxy)butane) | 1.5 |
| stabilizer (hydroquinone) | 0.01 |
| | 100 |

EXAMPLE 4

Edge weld adhesive for metal composite substances in the automobile industry

| | |
|---|---|
| scaffold polymer (ACM) | 30.0% by weight |
| unsaturated polyester (Roskydal$^R$ 850W) | 14.0 |
| cross-linking agent (trimethylol propane triacrylate) | 5.0 |
| cross-linking agent (Rütepox$^R$ Harz VE 3582) | 10.0 |
| filler (chalk) | 30.0 |
| softener (Mesamoll) | 10.0 |
| peroxide catalyst (tert-butyl-perbenzoate) | 1.0 |
| | 100 |

The shear strengths are 15 N/mm$^2$ at room temperature. Because of the high elasticity of the adhesive the composite material is fatigue-free and has good resistance to cold.

EXAMPLE 5

Adhesive for windscreen and rear window glass

The adhesive in accordance with the formulation below is applied as a self-adhesive tape with a silicon paper cover on the enamel layer of the pane. Then the silicon paper covering is removed and the pane is placed on the body. Then cross-linking is performed by heat. Before positioning pretreatment can be carried out by ultraviolet or electron radiation. Treatment of the freshly painted surfaces is usually not necessary.

| | |
|---|---|
| Scaffold polymer (ECO) | 40.0% by weight |
| unsaturated polyester (Crystic$^R$ 198) | 12.0 |
| unsaturated polyester (Roskydal$^R$ 850 W) | 8.0 |
| cross-linking agent (trimethylol propane triacrylate) | 5.0 |
| cross-linking agent (ethylene triglycol methacrylate) | 15.0 |
| filler (chalk) | 13.0 |
| pigment (titanium dioxide) | 2.0 |
| silane (Silicon Finish$^R$ GF 92, aminoethylaminopropyltrimethoxy silane, available from Wacker) | 3.0 |
| peroxide catalyst (tert-butyl perbenzoate) | 2.0 |
| | 100 |

This adhesive shows good stability against ozone, UV and water.

EXAMPLE 6

Adhesive for connecting rubber linings (hard or soft rubber) on sand-blasted steel in acid protection construction (e.g. in gas washing installations in combustion installations)

The thermo-reacting adhesive which contains solvent and is self-adhesive after drying is applied on the steel. After drying, the rubber linings are rolled in the adhesive. The cross-linking takes place during vulcanization. The adhesive strengths are above the cohesion values for rubber linings, and very good chemical stability is provided.

| | |
|---|---|
| Scaffold polymer (XNBR, e.g. Hycar$^R$ 1072, acrylonitrile/butadiene rubber, modified with carboxy groups) | 10.0% by weight |
| unsaturated polyester (Crystic$^R$ 198) | 2.0 |
| cross-linking agent (Actocryl$^R$ 400, vinylester based on acidic methacrylic bisphenol-A-diglycidylether) | 8.0 |
| pigment (titanium dioxide) | 8.0 |
| carbon black | 2.0 |
| peroxide catalyst (tert-butyl perbenzoate) | 1.0 |
| methylethyl ketone/ethylacetate 1:1 | 69.0 |
| | 100 |

EXAMPLE 7

Production of coil coating

At present in the coil coating process cross-linking temperatures of 180° C. and more are necessary to dry and to cross-link the adhesives on the market. The prescription given can be brought to reaction at 140° C.

| | |
|---|---|
| scaffold polymer (AU, e.g. Desmocoll$^R$ 530) | 12.0% by weight |
| unsaturated polyester (Viapal$^R$ 495 G) | 8.0 |
| cross-linking agent (PLEX 6661 from Röhm) | 6.0 |
| peroxide catalyst (tert-butyl permaleate) | 0.4 |
| methylethylketone/ethylacetate 1:1 | 73.6 |
| | 100 |

EXAMPLE 8

Reaction melt adhesive, general use

This adhesive is applied from the melt at 70° to 80° C. The cross-linking is done at temperatures above 120° C. If long storage life is required, a gelatine encapsulated benzoyl peroxide (e.g. NCH ® 40) is used. The activation temperature corresponds to the melt point of gelatine. Porous materials, metals, glass, ceramics, cross-linked and non-cross-linked plastics (but not untreated polyethylene or polypropylene) can be bonded with each other or against each other by using this adhesive.

| | |
|---|---|
| Scaffold polymer (CN) | 6.0% by weight |
| unsaturated polyester (Haftharz LTH$^R$) | 40.0 |
| unsaturated polyester (Roskydal$^R$ 850 W) | 45.0 |
| cross-linking agent (trimethylol propane triacrylate) | 5.0 |
| peroxide catalyst (Interox$^R$ TMCH AL 50 AL or MCH$^R$ 40) | 4.0 |
| | 100 |

We claim:

1. Thermo-setting reaction adhesive as a mono-component system having storage stability, containing respectively at least
   a) one unsaturated backbone polymer on the basis of a non-cross-linked elastomer in a concentration of 5 to 90% by weight,
   b) one unsaturated polyester in a concentration of 5 to 90% by weight,
   c) one unsaturated cross-linking agent in a concentration of 0.1 to 50% by weight, and
   d) one setting catalyst which provides radicals in a concentration of 0.2 to 6% by weight and which is selected from at least one of tert-butylperbenzoate; tert-butylpermaleate; bis(tert-butylperoxyisopropyl)benzene; 1,1-di(tert-butylperoxy)-3,3,5-trimethyl-cyclohexane; n-butyl-4,4-di(tert-butyl-peroxy(valerate; ethyl-3,3-di(tert-butylperoxy)butyrate; 3,3,6,6,9,9-hexamethyl-1,2,4,5-tetraoxa-cyclohexane; 2,2-bis(tert-butylperoxy)butane; and 1,1-bis(tert-butylperoxy)cyclohexane.

2. Adhesive as in claim 1, wherein the unsaturated backbone polymer is the reaction product of an elastomer containing hydroxyl groups with a diisocyanate.

3. Adhesive as in claim 1, wherein the unsaturated polyester is composed of unsaturated multi-base carboxylic acids or combinations of unsaturated/saturated multi-base carboxylic acids, reacted with multivalent alcohols.

4. Adhesive as in claim 1, wherein the cross-linking agent is a bi- or multi-functional acrylate compound or its derivative, an unsaturated hydroxy ester, an amino amide compound, ether monoester, glycidyl ester, oligomer of polyurethane, epoxide, unsaturated polyester or melamine.

5. Adhesive as in claim 1 which contains $Fe_2O_3$ as an additive.

6. Adhesive as in claim 1 which additionally contains at least one of fillers, pigments, carbon black and softeners.

7. Adhesive as in claim 1 which contains as an additive, at least one accelerator.

8. Adhesive as in claim 1 which contains at least one stabilizer as an additive.

9. Adhesive as in claim 1, wherein the adhesive is dissolved in a solvent.

10. Adhesive as in claim 1 which has a storage life of at least two years at room temperature when packed with free oxygen access.

11. Adhesive as in claim 1, wherein the adhesive is provided with a carrier or core.

12. Adhesive as in claim 1, wherein tile adhesive is present as a toil, film, plate, paste, tape or strand.

13. Adhesive as in claim 1 wherein when bonding polyethylene with aluminum, the adhesive possesses a shelling strength of more than 100 N/25 mm after 24 hours storage, and
    when bonding aluminum with itself, the adhesive attains tension shear values of 12 N/mm$^2$.

14. Adhesive as in claim 5, wherein said backbone polymer (a) is a rubber.

15. Adhesive as in claim 6, wherein said backbone polymer (a) is a rubber.

16. Adhesive its in claim 9, wherein said backbone polymer (a) is a rubber.

* * * * *